(12) United States Patent
Kwon (10) Patent No.: US 9,382,972 B2
(45) Date of Patent: Jul. 5, 2016

(54) REDUCER OF ELECTRIC POWER STEERING APPARATUS

(71) Applicant: MANDO CORPORATION, Pyeongtaek-si, Gyeonggi-do (KR)

(72) Inventor: Hyun Bi Kwon, Yongin (KR)

(73) Assignee: MANDO CORPORATION, Pyeongtaek-si (KR)

( * ) Notice: Subject to any disclaimer, the term of this patent is extended or adjusted under 35 U.S.C. 154(b) by 118 days.

(21) Appl. No.: 14/284,854

(22) Filed: May 22, 2014

(65) Prior Publication Data
US 2014/0352467 A1    Dec. 4, 2014

(30) Foreign Application Priority Data

May 28, 2013 (KR) .................. 10-2013-0060560

(51) Int. Cl.
*F16H 35/00* (2006.01)
*F16H 1/26* (2006.01)
*B62D 5/04* (2006.01)
*F16H 55/24* (2006.01)
*F16H 57/021* (2012.01)

(52) U.S. Cl.
CPC ............. *F16H 1/26* (2013.01); *B62D 5/0409* (2013.01); *F16H 55/24* (2013.01); *F16H 2057/0213* (2013.01); *Y10T 74/19585* (2015.01)

(58) Field of Classification Search
CPC ... F16H 55/24; F16H 2057/0213; F16H 1/26; F16H 1/16; F16H 57/022; B62D 5/0409; B62D 3/04; B62D 5/0454
USPC ............. 74/400, 409, 410, 388 PS; 180/444
See application file for complete search history.

(56) References Cited

U.S. PATENT DOCUMENTS

| | | | | |
|---|---|---|---|---|
| 6,044,723 | A * | 4/2000 | Eda ..................... | B62D 5/0409 180/443 |
| 8,074,531 | B2 * | 12/2011 | Yamazaki ........... | B62D 5/0409 74/388 PS |
| 2002/0195893 | A1 * | 12/2002 | Kobayashi .......... | B62D 5/0409 310/83 |
| 2004/0163879 | A1 * | 8/2004 | Segawa ............... | B62D 5/0409 180/444 |
| 2005/0224278 | A1 * | 10/2005 | Segawa ............... | B62D 5/0409 180/444 |
| 2006/0104553 | A1 * | 5/2006 | Faust .................... | F16C 29/04 384/49 |
| 2009/0249909 | A1 * | 10/2009 | Segawa ............... | B62D 5/0409 74/409 |
| 2010/0116582 | A1 * | 5/2010 | Rho .................... | B62D 5/0409 180/444 |
| 2011/0017542 | A1 * | 1/2011 | Kim .................... | B62D 5/0409 180/444 |

(Continued)

FOREIGN PATENT DOCUMENTS

| | | |
|---|---|---|
| JP | 2002-67992 A | 3/2002 |
| JP | 2006-513906 A | 4/2006 |

(Continued)

OTHER PUBLICATIONS

Office Action mailed Jun. 23, 2014 for KR10-2013-0060560, citing the above reference(s).

*Primary Examiner* — William Kelleher
*Assistant Examiner* — Zakaria Elahmadi
(74) *Attorney, Agent, or Firm* — Hauptman Ham, LLP (57) ABSTRACT

Disclosed is a reducer of an electric power steering apparatus. In the reducer, the worm wheel is elastically supported by the elastic member in a direction to the worm wheel in order to compensate for the spacing between the worm shaft and the worm wheel, and an elastic force of the elastic member applied to the bearing bush or the worm shaft bearing is simply adjusted and measured by adjusting or measuring a load applied to the supporting member.

11 Claims, 7 Drawing Sheets

(56) References Cited

U.S. PATENT DOCUMENTS

| | | | |
|---|---|---|---|
| 2011/0147113 A1* | 6/2011 | Ko | B62D 5/0409 180/444 |
| 2011/0220432 A1* | 9/2011 | Bugosh | B62D 5/0448 180/444 |
| 2012/0111657 A1* | 5/2012 | Hamakita | B62D 5/0409 180/444 |
| 2012/0186896 A1* | 7/2012 | Yamamoto | B62D 5/0448 180/444 |
| 2012/0217085 A1* | 8/2012 | Sekikawa | B62D 5/0409 180/444 |
| 2013/0075189 A1* | 3/2013 | Sekikawa | B62D 5/0409 180/444 |
| 2013/0126260 A1* | 5/2013 | Kim | B62D 5/0409 180/444 |
| 2013/0206497 A1* | 8/2013 | Fuechsel | B62D 5/0454 180/444 |
| 2013/0248279 A1* | 9/2013 | Rupp | B62D 5/0448 180/444 |
| 2013/0248280 A1* | 9/2013 | Stamm | B62D 5/0451 180/444 |
| 2013/0283940 A1* | 10/2013 | Boussaguet | F16H 25/08 74/55 |
| 2013/0291671 A1* | 11/2013 | Boussaguet | F16H 57/12 74/409 |
| 2014/0008142 A1* | 1/2014 | Yoshikawa | B62D 5/0409 180/444 |
| 2015/0075899 A1* | 3/2015 | Kikuchi | B62D 5/0409 180/444 |
| 2015/0266506 A1* | 9/2015 | Sato | B62D 5/0409 180/444 |

FOREIGN PATENT DOCUMENTS

| | | | | |
|---|---|---|---|---|
| WO | 2008/007736 A1 | | 1/2008 | |
| WO | WO 2011/104217 | * | 2/2010 | B62D 5/04 |
| WO | WO 2014073526 A1 | * | 5/2014 | B62D 5/0409 |

* cited by examiner

REDUCER OF ELECTRIC POWER STEERING APPARATUS

CROSS-REFERENCE TO RELATED APPLICATION

This application claims the priority under 35 U.S.C. §119(a) to Korean Application Serial No. 10-2013-0060560, which was filed in the Korean Intellectual Property Office on May 28, 2013, the entire content of which is hereby incorporated by reference.

BACKGROUND OF THE INVENTION

1. Field of the Invention

The present invention relates to a reducer of an electric power steering apparatus and, more particularly, to a reducer of an electric power steering apparatus in which a worm shaft is elastically supported by an elastic member in a direction of a worm wheel to compensate for spacing between the worm shaft and the worm wheel, and an elastic force of the elastic member applied to a bearing bush or a worm shaft bearing can be simply adjusted or measured by adjusting or measuring load applied to a supporting member.

2. Description of the Related Art

Figure 1:
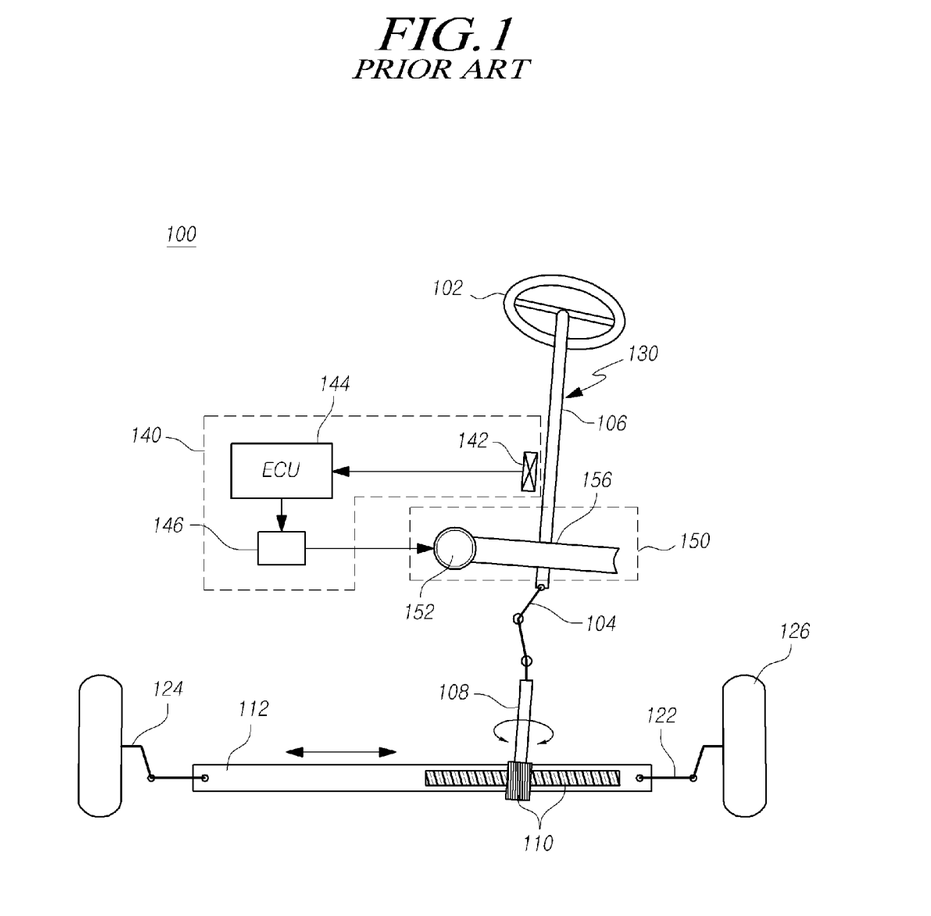
FIG. 1 is a view illustrating a structure of a conventional electric power steering apparatus.

FIG. 1 is a view illustrating a structure of a conventional electric power steering apparatus.

As shown in FIG. 1, the conventional power steering apparatus 100 includes a steering system 130 extending from a steering wheel 102 to both wheels 126, and an auxiliary power mechanism 140 for providing auxiliary steering power to the steering system 130.

The steering system 130 includes a steering shaft 106, which has one side connected to the steering wheel 102 and rotating along with the steering wheel 102, and the other side connected to a pinion shaft 108 by means of a universal joint 104. Further, the pinion shaft 108 is connected to a rack bar 112 through a rack and pinion mechanism 110, and both ends of the rack bar 112 are connected to wheels 126 through tie rods 122 and knuckle arms 124, respectively.

The auxiliary power mechanism 140 includes a torque sensor 142 for detecting a torque applied to the steering wheel 102 by a driver to output an electric signal in proportion to the detected torque, an electronic control unit 144 for generating a control signal based on an electric signal received from the torque sensor 142, an electric motor 146 for generating auxiliary power based on a control signal received from the electronic control unit 144, and a reducer 150 having a worm and a worm wheel 156 in order to transfer the auxiliary power generated by the electric motor 146 to the steering wheel 106.

Accordingly, in the electric power steering apparatus, the torque generated by a rotation of the steering wheel 102 is transmitted to a rack bar 112 through the rack and pinion mechanism 110, and the auxiliary power generated by the electric motor 146 is transmitted to the rack bar 112 according to the generated torque.

That is, the torque generated by the rotation of the steering wheel 102 and the auxiliary power generated by the electric motor 146 are added up to enable the rack bar 112 to move right and left.

Figure 2:
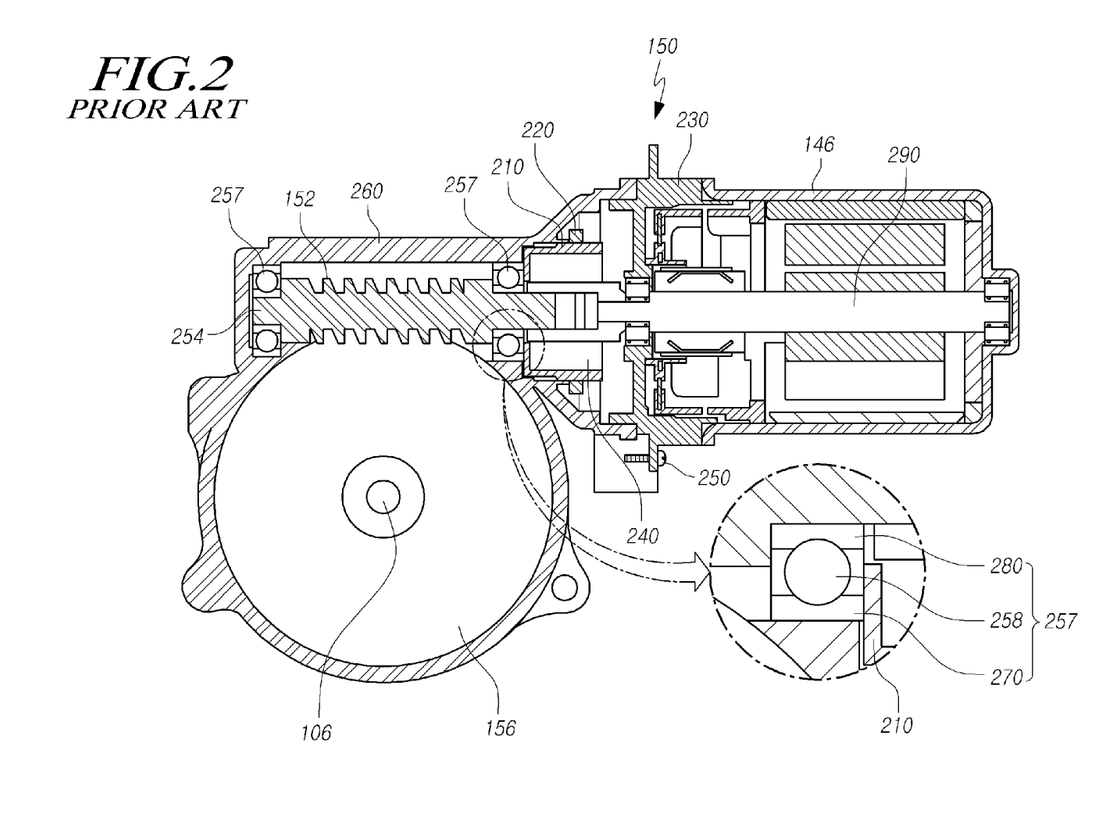
FIG. 2 is a sectional view illustrating a reducer of the conventional electric power steering apparatus.

FIG. 2 is a sectional view illustrating the reducer of the conventional electric power steering apparatus.

As shown in FIG. 2, the reducer 150 includes a worm shaft 254 on which a worm 152 is formed, worm shaft bearings 257 mounted on both ends of the worm shaft 254 respectively to support the worm shaft 254, a plug bolt 210 disposed between a damping coupler 240 and a worm shaft bearing 257 in order to prevent the worm shaft bearings 257 from being spaced in an axial direction of the worm shaft 254, and a plug nut 220 for fixing the plug bolt 210.

The worm shaft 254 is connected to a shaft 290 of the electric motor by means of the damping coupler 240, which is rotated by a driving of the electric motor 146.

The worm wheel 156 is disposed on a side of an outer periphery of the worm 152 and is tooth-engaged with the worm 152 formed on the worm shaft 254. The worm wheel 156 is mounted on the steering shaft 106 which transmits a rotation force of the steering wheel 102 operated by the driver, and transmits the rotation force of the worm shaft 254 generated by the electric motor 146 to the steering shaft 106.

A gear housing 260 has the worm 152, the worm wheel 156 and the like disposed therein, the electric motor 146 is mounted on a side of the gear housing 260 to provide a driving force to the worm shaft 254, and a motor cover 230 combined with the electric motor 146 is coupled with the gear housing 260 by means of a bolt 250.

The worm shaft bearing 257 has a structure in which balls 258 are interposed between an inner race 280 and an outer race 270, and supports a rotation of the worm shaft 254 connected to the electric motor 150 at an end portion of the gear housing 260.

The reducer of the electric power steering apparatus having the above described structure controls a driving of the electric motor by means of the electronic control unit provided to a vehicle according to a driving status of the vehicle. The rotation force of the worm shaft is added to the rotation force of the steering wheel operated by the driver, and is transmitted to the steering shaft, thereby smoothly and stably maintaining the steering status of the driver.

However, in the reducer of the conventional electric power steering apparatus, the worm and the worm wheel rotated by the driving of the electric motor cause friction, thereby increasing spacing between the worm and the worm wheel due to an abrasion. The spacing causes a generation of noise and also has a problem in that an auxiliary steering force assisting a force of operating the steering wheel by the driver is not accurately provided.

SUMMARY OF THE INVENTION

The present invention has been made to solve the above-mentioned problem in the conventional art, and an aspect of the present invention is to provide a reducer of an electric power steering apparatus, in which a worm shaft is elastically supported by an elastic member in a direction of a worm wheel to compensate for spacing between the worm shaft and the worm wheel, and an elastic force of the elastic member applied to a bearing bush or a worm shaft bearing can be simply adjusted or measured by adjusting or measuring load applied to a supporting member.

The aspect of the present invention is not limited thereto, and other aspects of the present invention will be apparently understood by those skilled in the art through the below description.

In accordance with an aspect of the present invention, a reducer of an electric power steering apparatus is provided. The reducer includes: a worm shaft bearing mounted on a distal end of a worm shaft which is tooth-engaged with a worm wheel and is connected to a motor shaft; a bearing bush having a side opened in an axial direction, in which the worm shaft bearing is inserted and supported, and an outer peripheral surface supported on an inner peripheral surface of a gear housing; an elastic member having one end thereof supported by the bearing bush or the worm shaft bearing so as to elastically support the worm shaft in a direction to the worm wheel; a supporting member coupled to the other end of the elastic member, in which an elastic force applied by the elastic member to the bearing bush or the worm shaft bearing is adjusted and measured through an adjustment and a measurement of a load applied to the supporting member; and, a hollow adjustment member in which the supporting member is inserted and supported, and coupled to the gear housing.

According to the embodiment of the present invention, the worm wheel is elastically supported by the elastic member in an axial direction of the worm wheel to compensate for the spacing between the worm shaft and the worm wheel, and an elastic force of the elastic member applied to the bearing bush or the worm shaft bearing is simply adjusted and measured by adjusting or measuring a load applied to the supporting member.

BRIEF DESCRIPTION OF DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the exemplary drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 3:
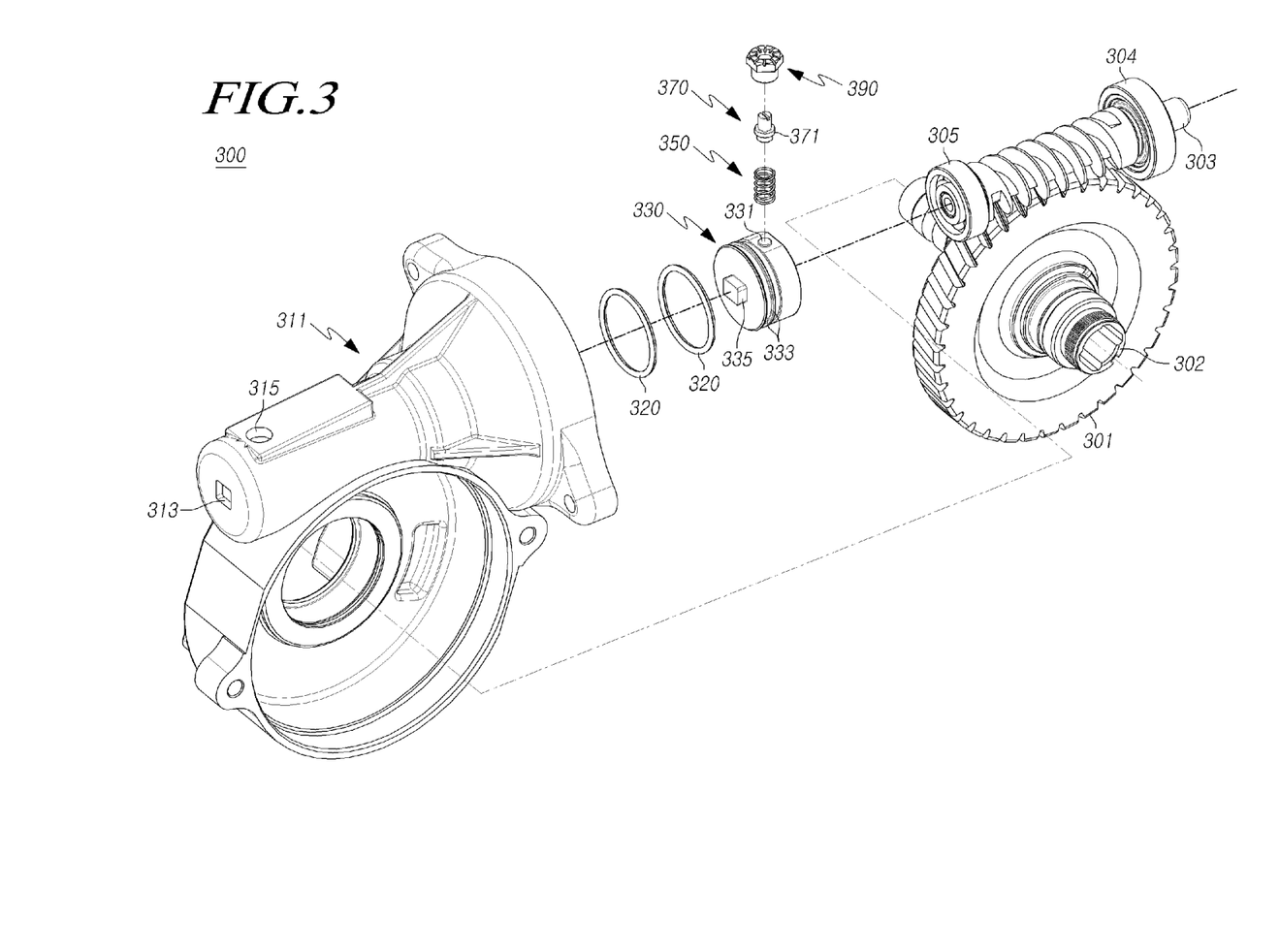
FIG. 3 is an exploded perspective view illustrating a reducer of an electric power steering apparatus according to the embodiment of the present invention.
Figure 4:
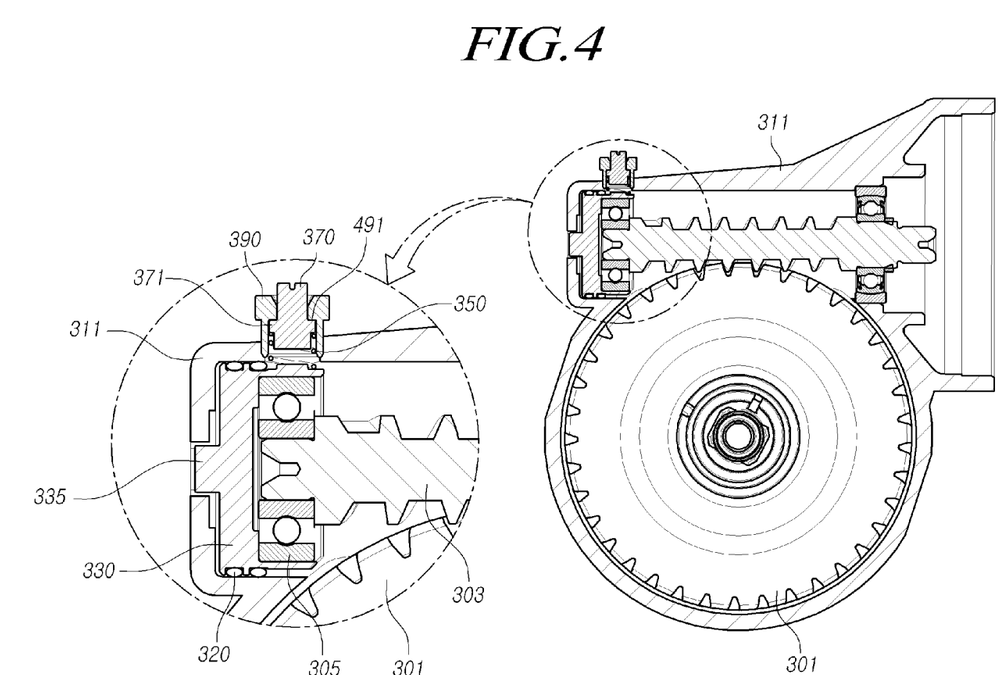
FIG. 4 is a sectional view illustrating the reducer of FIG. 3.
Figure 5:
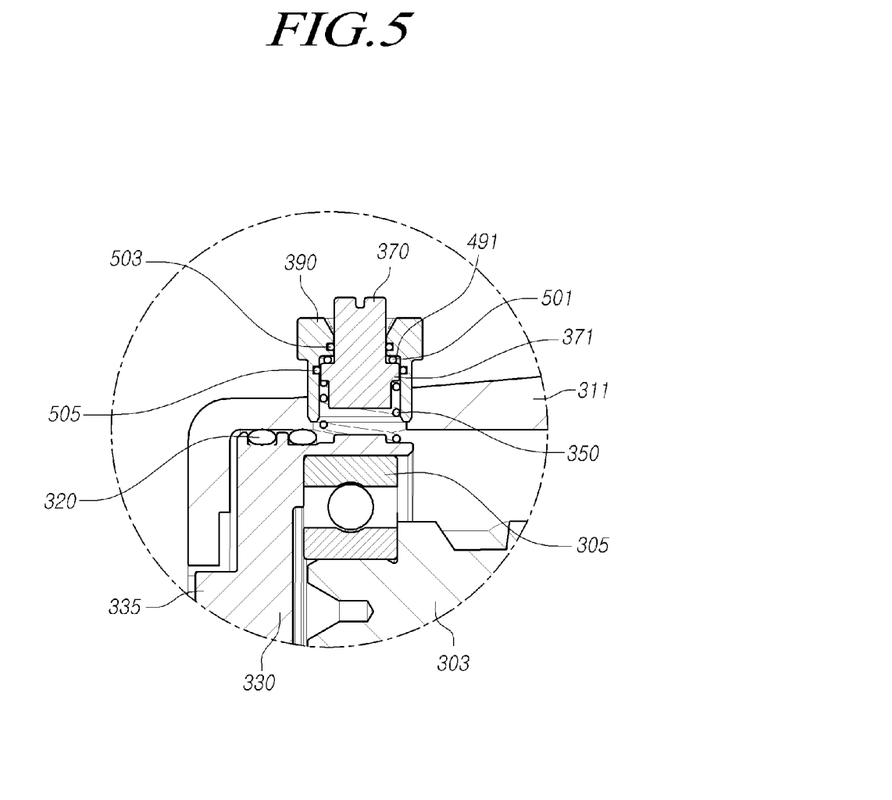
FIG. 5 is an enlarged sectional view illustrating a reducer of an electric power steering apparatus according to another embodiment of the present invention.
Figure 6:
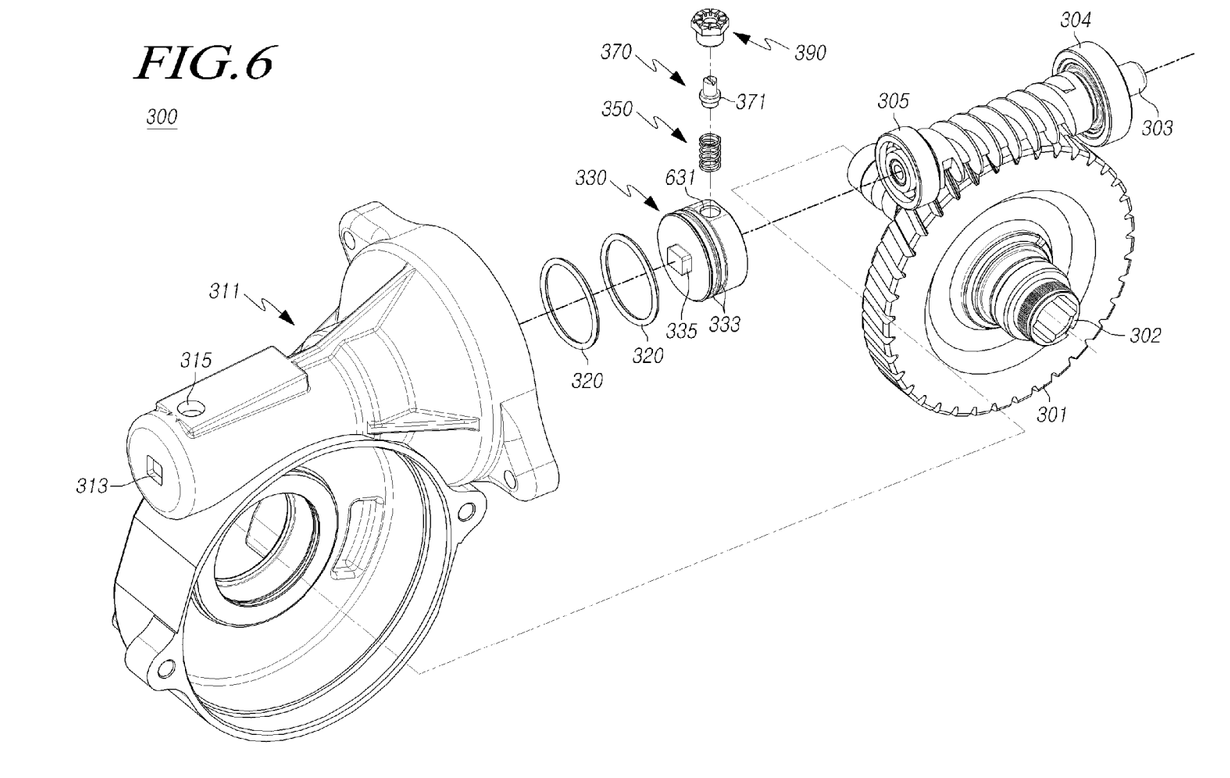
FIG. 6 is a perspective view illustrating a reducer of an electric power steering apparatus according to still another embodiment of the present invention.
Figure 7:
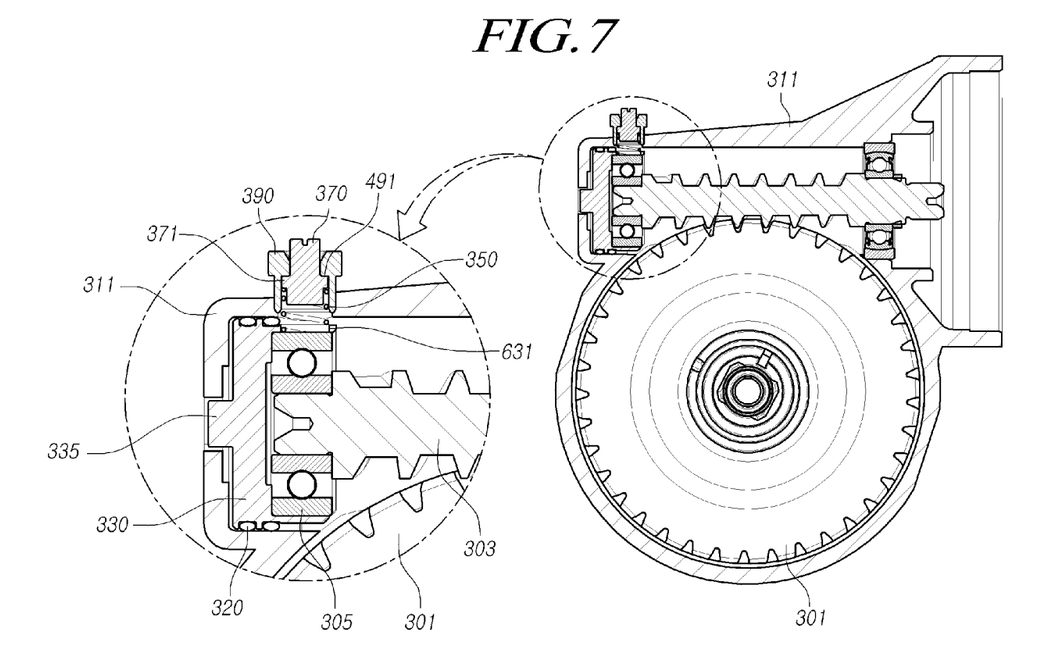
FIG. 7 is a sectional view illustrating the reducer of FIG. 6.

FIG. 3 is an exploded perspective view illustrating a reducer of an electric power steering apparatus according to the embodiment of the present invention. FIG. 4 is a sectional view illustrating the reducer of FIG. 3. FIG. 5 is an enlarged sectional view illustrating a reducer of an electric power steering apparatus according to another embodiment of the present invention. FIG. 6 is a perspective view illustrating a reducer of an electric power steering apparatus according to still another embodiment of the present invention. FIG. 7 is a sectional view illustrating the reducer of FIG. 6.

Referring to FIGS. 1 and 2, the reducer 300 of the electric power steering apparatus according to an embodiment of the present invention includes: a worm shaft bearing 305 mounted on a distal end of the worm shaft 303 which is tooth-engaged with the worm wheel 301 and is connected to a motor shaft 290; a bearing bush 330 having opening at a side thereof in an axial direction, in which the worm shaft bearing 305 is inserted and supported, and an outer peripheral surface thereof supported on an inner surface of a gear housing 311; an elastic member 350 having one end supported by the bearing bush 330 or the worm shaft bearing 305 so as to support the worm shaft 303 in an axial direction of the worm wheel 301; a supporting member 370 coupled to the other end of the elastic member 350, for adjusting and measuring an elastic force applied to the bearing bush 330 by the elastic member 350 through the adjustment and the measurement of the applied load; and, a hollow adjustment member 390 coupled to the gear housing 311, in which the supporting member 370 is inserted and supported.

The worm wheel 301 is tooth-engaged with the worm shaft 303, which is coupled to the steering shaft 302 connected to the steering wheel 102.

The worm shaft 303 is tooth-engaged with the worm wheel 301 as described above, on both ends of which the worm shaft bearings 304 and 305 are mounted. The worm shaft bearings 304 and 305 are supported on the inner surface of the gear housing 311.

On the other hand, the motor shaft 290 is connected to one end of the worm shaft 303. When the motor shaft 290 rotates as the electric motor 146 operates, the worm shaft 303 rotates in association with the motor shaft 290.

The bearing bush 330 has one side opened in an axial direction so that the worm shaft bearing 305 coupled to the distal end of the worm shaft 303 connected to the motor shaft 290 is inserted in and supported by the bearing bush 330. An outer peripheral surface of the bearing bush 330 is supported in the inner surface of the gear housing 311.

Herein, the axial direction means a lengthwise direction of the worm shaft 303.

Alternately, a supporting unit 331 may be radially formed on the outer peripheral surface of the bearing bush 330 so that one end of the elastic member 350 described later is mounted and supported on the supporting unit 331. The supporting unit 331 may be formed to have a protruding cylindrical shape, or a recess shape.

The supporting unit 331 is radially formed on an outer peripheral surface of the bearing bush 330, and thus, the elastic member 350 described later is stably supported by the bearing bush 330 to apply the elastic force to the bearing bush 330.

Alternately, as shown in FIG. 6, the bearing bush 330 has a through hole 631 formed therein instead of the supporting unit 331, in which one end of the elastic member 350 may directly and elastically support the worm shaft bearing 305 through the through hole 631.

If the through hole 631 is formed in the bearing bush 330, the elastic member 350, which directly and elastically supports the worm shaft bearing 305, is supported on an inner peripheral surface of the through hole 631 to stably apply the elastic force to the worm shaft bearing 305.

Further, the elastic supporting body 320 is further coupled to an outer peripheral surface of the bearing bush 330 in a radial direction so as to buffer a movement of the bearing bush 330 between an inner surface of the gear housing 311 and the outer peripheral surface of the bearing bush 330. The elastic supporting body 330 is inserted in a coupling groove formed along a peripheral direction on the outer peripheral surface of the bearing bush 330 in a radial direction.

The elastic supporting body 320 has an annular ring shape. In the drawings, two elastic supporting bodies 320 are mounted on the outer peripheral surface of the bearing bush 330 in a radial direction.

As the elastic supporting body 320 is mounted on the outer peripheral surface of the bearing bush 330 in the radial direction, it is possible to prevent a collision of the bearing bush 330 against the gear housing 311 although the bearing bush 330 moves in a direction perpendicular to an axial direction, i.e., in a radial direct of the bearing bush 330. Accordingly, it is possible to prevent the generation of noise.

Further, a guide protrusion 335 protrudes in the axial direction on an outer surface at the other end of the bearing bush 330, which is inserted in the through hole 313 formed in the gear housing 311.

Since the through hole 313 is formed in the gear housing 311 and the guide protrusion 335 is formed on the bearing bush 330, it is possible to restrict the movement of the bearing bush 330 in the gear housing 311 and to prevent a rotation of the bearing bush 330 in a circumferential direction.

Next, the elastic member 350 has one end coupled to the bearing bush 330 to elastically support the worm shaft 303 in a direction to the worm wheel 301. As an example, the elastic member 350 may include a coil spring, and the one end of the elastic member 350 is coupled to and supported by the supporting unit 331 of the bearing bush 330 as described above.

The elastic member 350 elastically supports the worm shaft 303 in a direction to the worm wheel 301, so as to compensate for the spacing between the worm shaft 303 and the worm wheel 301.

In turn, the supporting member 370 is coupled to the other end of the elastic member 350, and the elastic force which the elastic member 350 applies to the bearing bush 330 is adjusted and measured by adjusting and measuring the load applied to the supporting member 370.

That is, since the supporting member 370 is coupled to the other end of the elastic member 350 connected to the bearing bush 330, the load under which the supporting member 370 pushes the elastic member 350 is applied to the bearing bush 330 as the elastic force by which the elastic member 350 elastically supports the bearing bush 330. Thus, when the load applied to the supporting member 370 is measured, it is possible to measure an elastic force, which the elastic member 350 applies to the bearing bush 330. In addition, when the load applied to the supporting member 370 is adjusted, the elastic force, which the elastic member 350 applies to the bearing bush 330, may be adjusted.

Further, since the elastic force of the elastic member 350 is directly adjusted or measured through the load applied to the supporting member 370, an elastic force of the elastic member 350 may be set to a required value regardless of a load dispersion of the elastic member 350 or a measurement dispersion of other parts.

As an example, the supporting member 370 may be provided as a bar having a cylindrical shape. A protruding step portion 371 may be further formed on an outer peripheral surface of the supporting member 370, which has one side thereof supporting the other end of the elastic member 350 and the other side supported on a step portion 491 formed on an inner peripheral surface of the adjustment member 390 described above.

In turn, the adjustment member 390 has a hollow shape and is coupled to the gear housing 311, in which the supporting member 370 is inserted and supported.

That is, the adjustment member 390 performs a function of fixing a position of the supporting member 370 to which a predetermined load is applied, and has a hollow shape. A worker can identify the supporting member 370 inserted in the adjustment member 390 after coupling the adjustment member 390 to the gear housing 311, and may simply measure the load applied to the supporting member 370 inserted into the adjustment member 390 by using a measurement device.

The adjustment member 390 is screwed into the hole 315 formed in the gear housing 311 by a screw. As the adjustment member 390 is screwed into the hole 315 of the gear housing 311, the supporting member 370 may precisely adjust the load applied to the elastic member 350.

As described above, the adjustment 390 has a step portion 491 formed therein to support the protruding end 371 of the supporting member 370. By forming the step portion 491 on the adjustment member 390, the supporting member 370 inserted in the adjustment member 390 is prevented from being separated to outside.

On the other hand, as shown in FIG. 5, a buffering member 501 may be further provided between the step portion 491 of the adjustment member 390 and the protrusion 371 of the supporting member 370. The buffering member 501 buffers an impact between the step portion 491 and the protrusion 371. For example, the buffering member 501 has a ring shape made of an elastic material, and is mounted on an outer peripheral surface of the supporting member 370 to be opposite to the other side of the protrusion 371.

Although it is not shown in the drawings, a seat groove having a concave shape may be further formed in the protrusion 371 along a circumferential direction so that the buffering member 501 is stably seated.

Further, isolation members 503 and 505 may be further disposed between an inner peripheral surface of the adjustment member 390 and an outer peripheral surface of the supporting member 370. The isolation members 503 and 505 prevent permeation of alien substance between the supporting member 370 and the adjustment member 390. For example, the isolation members 503 and 505 are formed of an elastic material to have a ring shape.

On the other hand, FIG. 5 shows an example in which the isolation members 503 and 505 are seated in grooves radially formed in the inner peripheral surface of the adjustment member 390. However, the isolation members 503 and 505 may be seated in the grooves radially formed in the outer peripheral surface of the supporting member 370.

A process of adjusting an elastic force of the elastic member in the reducer of the electric power steering apparatus according to the embodiment of the present invention will be described with reference to the drawings.

Firstly, the worker assembles the worm shaft bearing 305 and the bearing bush 330 in the gear housing 311.

In this event, when the guide protrusion 335 of the bearing bush 330 is inserted in the through hole 313 of the gear housing 311, the supporting unit 331 of the bearing bush 330 is fitted in the hole 315 of the gear housing 311.

Then, the worker inserts the elastic member 350 and the supporting member 370 into the hole 315 of the gear housing 311 and temporarily assembles the adjustment member 390 with the hole 315, and then pushes the supporting member 370 while identifying whether a set load is applied to the supporting member, by using the measurement device.

In turn, the adjustment member is tightened again to fix the position of the supporting member 370 at a time point when the set load is applied to the supporting member 370.

On the other hand, in the case where the elastic force which the elastic member 350 applies to the bearing bush 330 or the worm shaft bearing 305 is intended to be adjusted or measured again after the reducer is operated, although the adjustment member 390 is not fully released and separated, the measurement device is inserted in the hollow of the adjustment member 390 to simply reset or measure the load applied to the supporting member 370 again. Thus, it is possible to reset or re-measure the elastic force, which the elastic member 350 applies to the bearing bush 330 or the worm shaft bearing 305.

As described above, according to the embodiment of the present invention, the worm wheel is elastically supported by the elastic member in a direction to the worm wheel to compensate for the spacing between the worm shaft and the worm wheel, and an elastic force of the elastic member applied to the bearing bush or the worm shaft bearing is simply adjusted and measured by adjusting or measuring a load applied to the supporting member.

Even if it was described above that all of the components of an embodiment of the present invention are coupled as a single unit or coupled to be operated as a single unit, the present invention is not necessarily limited to such an embodiment. At least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

DESCRIPTION OF REFERENCE NUMERALS

290: motor shaft
300: reducer
301: worm wheel
303: worm shaft
305: worm shaft bearing
311: gear housing
330: bearing bush
350: elastic member
370: supporting member
390: adjustment member

What is claimed is:

1. A reducer of an electric power steering apparatus, the reducer comprising: a worm shaft bearing mounted on a distal end of a worm shaft which is tooth-engaged with a worm wheel and is connected to a motor shaft; a bearing bush having a side opened in an axial direction, in which the worm shaft bearing is inserted and supported, and an outer peripheral surface supported on an inner peripheral surface of a gear housing; an elastic member having one end thereof supported by the bearing bush or the worm shaft bearing so as to elastically support the worm shaft in a direction to the worm wheel; a supporting member coupled to the other end of the elastic member, in which an elastic force applied by the elastic member to the bearing bush or the worm bearing is adjusted and measured through an adjustment and a measurement of a load applied to the supporting member; a hollow adjustment member in which the supporting member is inserted and supported, and coupled to the gear housing; and an isolation member disposed between an outer peripheral surface of the supporting member and an inner peripheral surface of the adjustment member, wherein the isolation member is disposed on a protruded portion of the supporting member.

2. The reducer as claimed in claim 1, wherein if one end of the elastic member is supported on the bearing bush, a supporting unit is radially formed on an outer peripheral surface of the bearing bush to support one end of the elastic member coupled thereto.

3. The reducer as claimed in claim 1, wherein if one end of the elastic member is supported on the worm shaft bearing, the bearing bush has a through hole formed therein, through which one end of the elastic member extends.

4. The reducer as claimed in claim 1, wherein an elastic supporting body is mounted on an outer peripheral surface of the bearing bush in a radial direction to buffer a movement of the bearing bush between the outer peripheral surface of the bearing bush and an inner peripheral surface of the gear housing.

5. The reducer as claimed in claim 1, further comprising: a guide protrusion formed on an outer peripheral surface of the other axial end of the bearing bush, the guide protrusion being inserted into a through hole formed in the gear housing to restrict a movement of the bearing bush.

6. The reducer as claimed in any one of claim 1, further comprising: a protruding end protruding in a radial direction from an outer peripheral surface of the supporting member and having one side supporting the other end of the elastic member and the other side supporting a step portion formed on an inner peripheral surface of the adjustment member.

7. The reducer as claimed in claim 6, further comprising: a buffering member for buffering an impact between the step portion and the protrusion end.

8. The reducer as claimed in claim 7, wherein the buffering member is formed of an elastic material and has a ring shape, which is mounted on an outer peripheral surface of the supporting member from the other side of the protrusion end.

9. The reducer as claimed in claim 1, wherein the isolation member is configured to prevent permeation of an alien substance between the supporting member and the adjustment member.

10. The reducer as claimed in claim 9, herein the isolation member is formed of an elastic material and has a ring shape.

11. The reducer as claimed in claim 1, wherein the adjustment member is screwed into the gear housing.

* * * * *